United States Patent
Berthelot et al.

(10) Patent No.: US 11,269,986 B2
(45) Date of Patent: Mar. 8, 2022

(54) METHOD FOR AUTHENTICATING A PROGRAM AND CORRESPONDING INTEGRATED CIRCUIT

(71) Applicants: STMicroelectronics (Grand Ouest) SAS, Delarue (FR); STMicroelectronics (Rousset) SAS, Rousset (FR)

(72) Inventors: Vincent Berthelot, Le Mans (FR); Layachi Daineche, Bouc-bel-Air (FR)

(73) Assignees: STMicroelectronics (Grand Ouest) SAS, Delarue (FR); STMicroelectronics (Rousset) SAS, Rousset (FR)

( * ) Notice: Subject to any disclaimer, the term of this patent is extended or adjusted under 35 U.S.C. 154(b) by 220 days.

(21) Appl. No.: 16/660,243

(22) Filed: Oct. 22, 2019

(65) Prior Publication Data

US 2020/0134164 A1    Apr. 30, 2020

(30) Foreign Application Priority Data

Oct. 26, 2018    (FR) .................................. 1859911

(51) Int. Cl.
G06F 21/00    (2013.01)
G06F 21/44    (2013.01)

(52) U.S. Cl.
CPC .................... *G06F 21/44* (2013.01)

(58) Field of Classification Search
CPC .................................................. G06F 21/44
See application file for complete search history.

(56) References Cited

U.S. PATENT DOCUMENTS

| 2006/0177068 A1 | 8/2006 | Hatakeyama | |
| 2006/0179324 A1* | 8/2006 | Hatakeyama | G06F 12/1408 713/187 |
| 2008/0141017 A1* | 6/2008 | McCoull | G07F 17/32 713/2 |
| 2018/0309578 A1 | 10/2018 | Farrell et al. | |

OTHER PUBLICATIONS

INPI Search Report and Written Opinion for FR 1859911 dated Jun. 25, 2019 (8 pages).

* cited by examiner

*Primary Examiner* — Jeffrey C Pwu
*Assistant Examiner* — Rodman Alexander Mahmoudi
(74) *Attorney, Agent, or Firm* — Crowe & Dunlevy

(57) ABSTRACT

A memory stores a program to be executed by a microprocessor. The program includes a first program part and a second program part. An authenticator is configured to authenticate the program and includes a module that is external to the microprocessor and configured to authenticate said first program part when the microprocessor is inactive. The authenticator further activates the microprocessor to execute the first program part and authenticate said second program part using instructions of the first program part if the module has authenticated the first program part. The microprocessor then executes the second program part if the microprocessor has authenticated said second program part.

10 Claims, 2 Drawing Sheets

METHOD FOR AUTHENTICATING A PROGRAM AND CORRESPONDING INTEGRATED CIRCUIT

PRIORITY CLAIM

This application claims the priority benefit of French Application for Patent No. 1859911, filed on Oct. 26, 2018, the content of which is hereby incorporated by reference in its entirety to the maximum extent allowable by law.

TECHNICAL FIELD

Modes of implementation and embodiments relate to the protection of data, for example of the words or instructions of a program code, in an internal memory of an integrated circuit.

BACKGROUND

Integrated circuits, in particular those equipped with memories containing sensitive information, have to be protected to the greatest possible extent against attacks, in particular attacks intended to uncover stored data.

The attacker could, for example, insert his own program or modify the existing program in the internal memory of the integrated circuit.

There is a need to detect attempts to modify a program code in a memory internal to an integrated circuit, this program code being intended to be executed by a processing unit of the integrated circuit, in particular but without limitation a processing unit, or microprocessor, of a microcontroller, for example a microcontroller of the STM32 family marketed by STMicroelectronics.

It is therefore particularly useful to seek to protect the integrated circuit against an attack aimed at modifying a program so as to access sensitive data.

There is also a need to be able to authenticate a program in the internal memory of the integrated circuit.

According to modes of implementation and embodiments, it is proposed to meet this need with a solution that is easy to implement and that guarantees improved security.

SUMMARY

According to one aspect, what is proposed is a method for authenticating a program stored in a memory, said program being intended to be executed by a microprocessor and including a first program part and a second program part. The method comprises: a first authentication of said first program part by a module situated outside said microprocessor, the microprocessor being inactive; if the first program part is authenticated, activation of said microprocessor and execution of said first program part by the microprocessor, including a second authentication of said second program part; and if the second program part is authenticated, execution of said second program part by the microprocessor.

In other words, two authentications are performed.

A first authentication is performed by a hardware computing circuit external to the microprocessor.

The architecture and the behavior of the hardware computing circuit are initially coded, for example, in VHDL (for "VHSIC Hardware Description Language"), and then synthesized so as to obtain a hardware module that performs the desired functions, for example in this case a module configured so as to perform computations.

Said module recovers the data of the first program part in order to authenticate them. If said first program part is authenticated, the module, by way of its coded instructions, activates the microprocessor.

A second authentication is then performed. The microprocessor recovers the instructions of the first program part from the memory in order to execute them.

The instructions of the first program part that are executed by the microprocessor make it possible to authenticate the second program part. If the second part is authenticated, the microprocessor recovers the instructions of the second program part and executes them.

Performing two authentications makes it possible to bolster the security of the system containing said program. In addition, the use of a hardware computing circuit outside the microprocessor makes it possible to increase the speed of execution of the instructions of said module and therefore to perform the first authentication more quickly.

According to one mode of implementation, the method comprises, prior to the first authentication, storage, in said module, of a first identifier of the first program part, and the first authentication includes a first computation of a first new identifier of the first program part and a comparison between the first identifier and the first new identifier, the first program part being considered to be authenticated if the first identifier and the first new identifier are identical.

"First identifier" is understood to mean, for example, a fingerprint used to identify the first program part.

If an item of data is modified in the first program part, the fingerprint changes. A new first fingerprint corresponding to a new first identifier is therefore obtained after said first computation.

If no item of data has been modified in the first program part, the new first identifier does not change.

The first identifier and the first new identifier being identical therefore makes it possible to confirm that said first program part has not been modified.

According to one mode of implementation, the first computation comprises implementing a first hash function having said first program part as input parameter and delivering said first new identifier at output.

The first hash function makes it possible to compute the new first fingerprint of the first part corresponding to the new first identifier. It is possible to use any cryptographically secure hash function, for example the function known to those skilled in the art under the name SHA 256.

According to one mode of implementation, the method comprises, prior to the first authentication, storage, in the second program part, of a second identifier of the second program part, and the second authentication includes a second computation of a second new identifier of the second program part and a comparison between the second identifier and the second new identifier, the second program part being considered to be authenticated if the second identifier and the second new identifier are identical.

"Second identifier" is understood to mean, for example, a fingerprint used to identify the second program part. If an item of data is modified in the second program part, the fingerprint changes. A new second fingerprint corresponding to a new second identifier is therefore obtained after said second computation.

If no item of data has been modified in the second program part, the new second identifier does not change.

The second identifier and the second new identifier being identical therefore makes it possible to confirm that said second program part has not been modified.

According to one mode of implementation, the second computation comprises implementing a second hash function having said second program part and a key as input parameters and delivering said second new identifier at output.

The second hash function makes it possible to calculate the new second fingerprint of the second program part corresponding to the second new identifier. It is possible to use any cryptographically secure hash function that takes two parameters at input: the second part of the program and a key, for example a hardware key.

The first and second hash functions may be identical or different.

According to one mode of implementation, said key is stored in a protected module and accessible only to said first program part, and said key is made inaccessible once the second authentication has ended.

It is advantageous to make the key inaccessible so as to avoid an attacker subsequently using it.

According to another aspect, what is proposed is a system including a microprocessor, a memory configured so as to store a program intended to be executed by the microprocessor and comprising a first program part and a second program part, and an authentication circuit configured so as to authenticate the program and including: a module external to the microprocessor and configured so as to authenticate said first program part, said microprocessor being inactive and; the microprocessor configured so as to execute said first program part and authenticate said second program part using instructions of the first program part, if said module has authenticated said first program part, and so as to execute the second program part if the microprocessor has authenticated said second program part.

According to one embodiment, said module is configured so as to store a first identifier of the first program part prior to the authentication of the first part, and configured so as to perform a first computation of a first new identifier of the first program part and compare the first identifier with the first new identifier, the first program part being considered to be authenticated by said module if the first identifier and the first new identifier are identical.

According to one embodiment, said module is configured so as to implement a first hash function having said first program part as input parameter and delivering the first new identifier at output.

According to one embodiment, the second program part comprises a second identifier, the microprocessor being configured so as to perform a second computation of a second new identifier and compare the second identifier with the second new identifier, the second program part being considered to be authenticated by the microprocessor if the second identifier and the second new identifier are identical.

According to one embodiment, the microprocessor is configured so as to implement a second hash function having said second program part and a key as input parameters and delivering said second new identifier at output.

According to one embodiment, the system comprises a protected module configured so as to store said key accessible only to the microprocessor, the microprocessor being configured so as to make the key inaccessible once the authentication of the second part has ended.

BRIEF DESCRIPTION OF THE DRAWINGS

Other advantages and features of the invention will become apparent on reading the detailed description of wholly non-limiting modes of implementation and embodiments and the appended drawings, in which.

DETAILED DESCRIPTION

Figure 1:
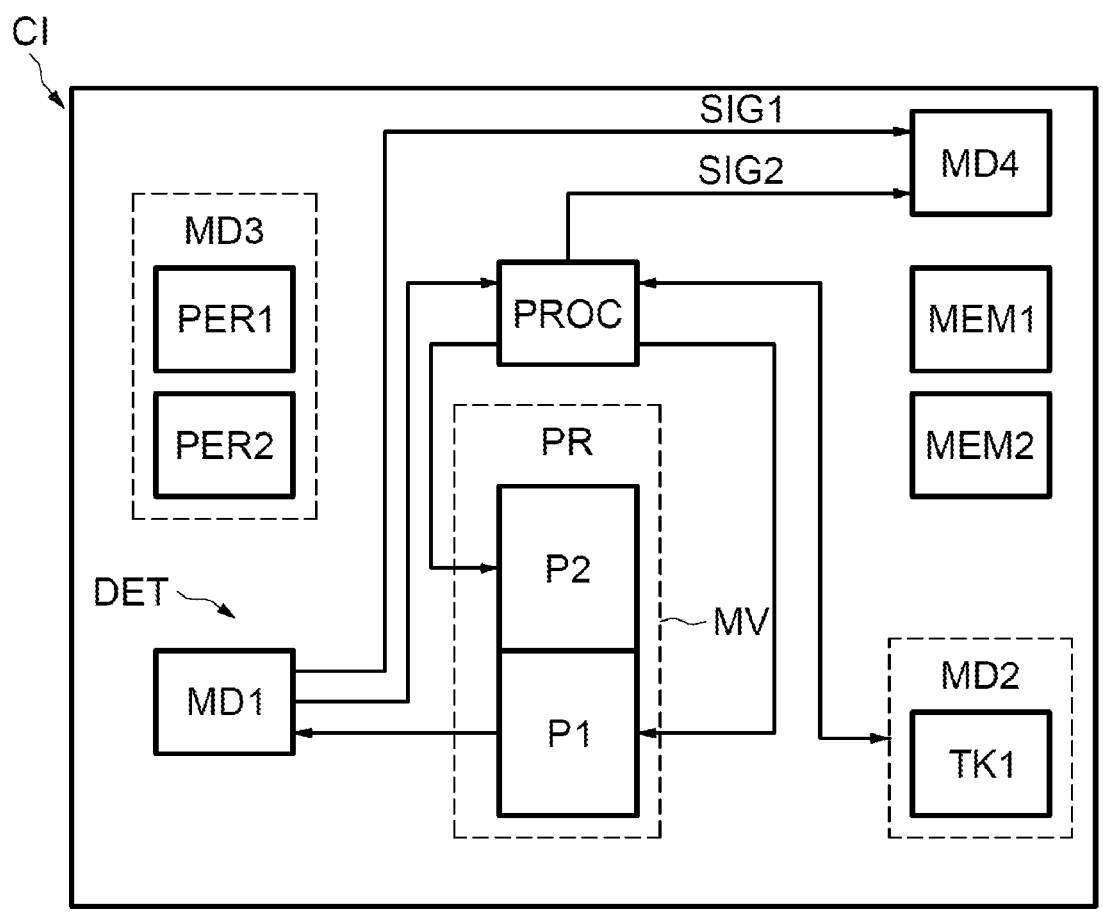
FIG. 1 schematically illustrates a system.

In FIG. 1, the reference CI denotes a system, for example an integrated system such as a microcontroller comprising a non-volatile memory, for example a read-only memory MV, containing a program PR.

Said program PR includes two parts: a first program part P1 and a second program part P2.

The system CI comprises authentication circuit DET configured so as to authenticate the program PR.

Said authentication circuit DET comprises a first hardware module MD1 and a microprocessor PROC.

The first module MD1 is external to the microprocessor PROC and includes a computing circuit whose architecture and behavior have been described in terms of hardware, that is to say in a language such as VHDL (for "VHSIC Hardware Description Language").

The architecture and the behavior are then synthesized so as to obtain said first hardware module MD1 containing instructions.

The first module MD1 is configured so as to authenticate the first program part P1. It is therefore coupled to the memory MV so as to be able to access and retrieve the data of said first program part P1.

To this end, the first module MD1 is configured so as to execute its hardware instructions.

The first module MD1 contains a first identifier representative of the first program part P1.

"First identifier" is understood to mean a fingerprint used to identify the first program part. If an item of data is modified in the first part P1 of the program, the fingerprint changes.

The microprocessor PROC is also coupled to the first program part P1. It is configured so as to access and retrieve the instructions of the first program part P1 in order to execute them. The execution of the instructions of the first program part P1 allows the microprocessor PROC to authenticate the second program part P2.

To this end, the microprocessor PROC is coupled to the second program part P2. It is configured so as to access and retrieve the data of the second program part P2 that is stored in the memory MV.

The second part P2 contains a second identifier representing it.

"Second identifier" is understood to mean a fingerprint used to identify the second program part. If an item of data is modified in the second part of the program, the fingerprint changes.

The microprocessor PROC is also configured so as to access and retrieve the instructions of the second program part P2 in order to execute them.

The first module MD1 is also coupled to the microprocessor PROC and is configured so as to activate the microprocessor PROC if it authenticates the first program part P1.

The system CI also, but without limitation, includes a first random access memory MEM1 and a second random access memory MEM2 comprising data.

The first random access memory MEM1 and the second random access memory MEM2 are configured so as to supply said stored data to the microprocessor PROC. These data are necessary or useful for the execution of the instructions of other programs contained, for example, in the memory MV by the microprocessor.

The system CI comprises a second protected module MD2 comprising a hardware key TK1 that participates in the authentication of the second program part P2. Said module MD2 is coupled to the microprocessor PROC. The module MD2 may, for example, comprise any known type of memory or protected register.

The microprocessor PROC is configured so as to access said module MD2 and retrieve the hardware key TK1 in the authentication of the second program part.

This key is accessible only to the microprocessor. One non-limiting exemplary implementation of such access restriction will be described hereinafter.

The system CI comprises a third module MD3 comprising input or output peripherals (PER1, PER2), for example a server.

It also comprises a fourth module MD4 coupled to the first module MD1. The first module MD1 is configured so as to send a first signal SIG1 in a high state or in a low state to the fourth module MD4.

For example, the high state may correspond to a "1", and the low state may correspond to a "0".

The fourth module MD4 is configured so as to generate an alarm signal if the received first signal SIG1 is, for example, "0".

The fourth module MD4 is also coupled to the microprocessor PROC. The microprocessor PROC is configured so as to send a second signal SIG2 in a high state or in a low state to the fourth module MD4.

For example, the high state of the second signal SIG2 may correspond to a "1", and the low state may correspond to a "0".

The fourth module MD4 is also configured so as to generate an alarm signal if the received second signal SIG2 is, for example, "0".

Figure 2:
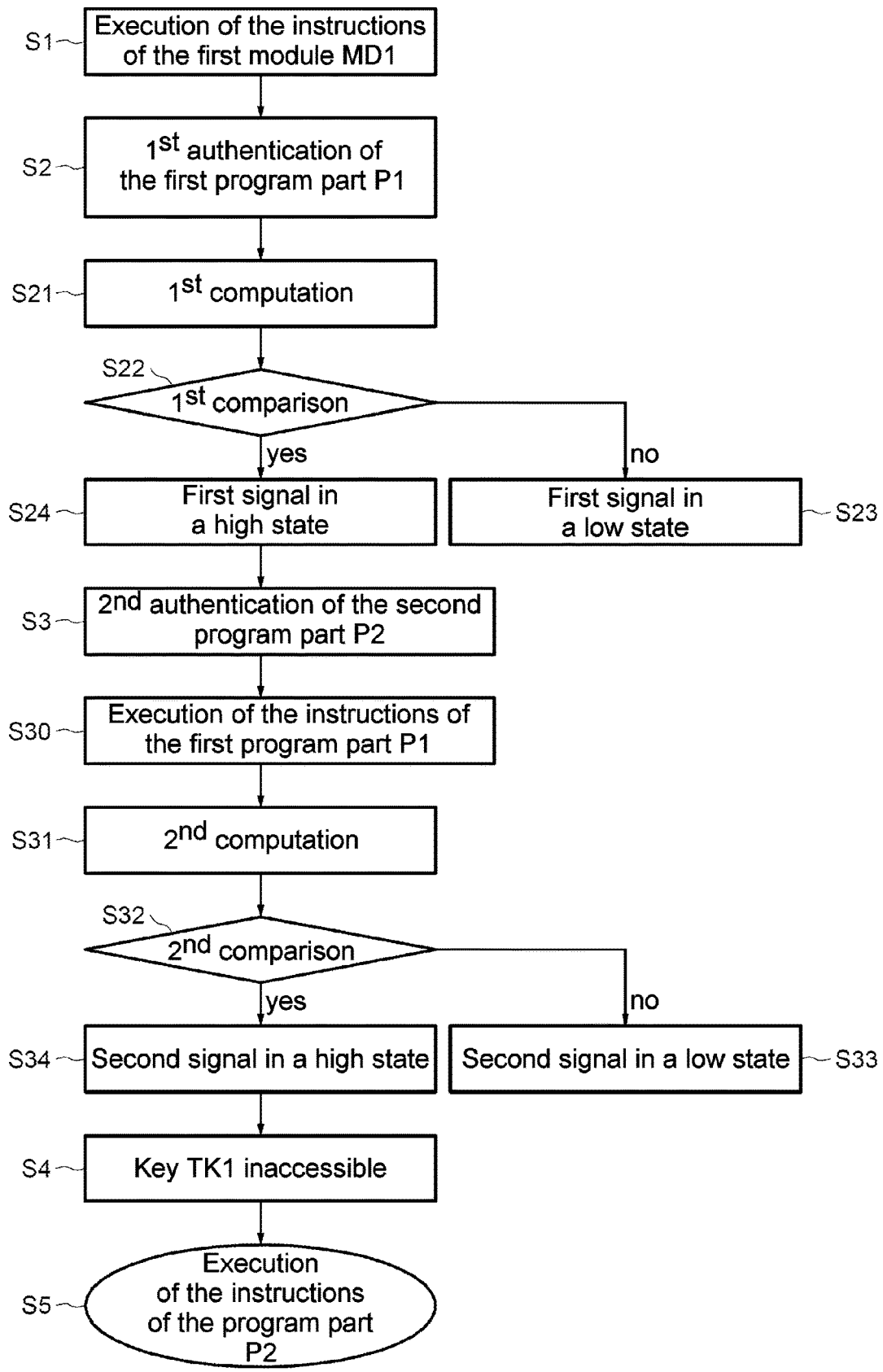
FIG. 2 schematically illustrates a flow chart for operation of an authentication process.

The operation of the authentication circuit DET will be described in FIG. 2, which shows a flowchart according to one mode of implementation.

Once the system CI has been booted, the first module MD1, which is at the root of the system, executes the instructions that it contains. This is step S1.

The instructions executed by said first module MD1 make it possible to launch, in step S2, the first authentication of the data of the first program part P1.

This first authentication includes steps S21 to S23.

More precisely, the first module MD1 retrieves the data of the first program part that are contained in the memory MV in order to process them in step S21.

In step S21, said first module MD1, by executing its instructions, performs a first computation of a first new identifier of the first program part P1.

The first computation comprises the implementation, by said first module MD1, of a first hash function having the first program part P1 as an input parameter.

The first hash function makes it possible to compute the new first fingerprint of the first part and therefore the first new identifier. It is possible to use any cryptographically secure hash function, for example the SHA 256 function.

To this end, the hash function has the data of said first program part P1 as input parameter and delivers the first new identifier at output.

If no item of data has been modified in the first program part, the new first identifier does not change from the first identifier. The first identifier and the first new identifier being identical makes it possible to confirm that said first program part has not been modified.

A first comparison is therefore performed in step S22 between the first new identifier and the first identifier.

Once step S22 has ended, the first module MD1 sends the first signal SIG1 to the fourth module MD4.

If the first signal SIG1 is in a low state, as in step S23, this means that the first new identifier and the first identifier are not identical, otherwise the first signal SIG1 is in a high state, as illustrated in step S24.

The low state of the first signal SIG1 allows the fourth module MD4 to block the system CI.

The high state of the first signal SIG1 makes it possible to access step S3 in order to authenticate the data of the second program part P2.

The second authentication includes steps S30 to S34.

More precisely, the first module MD1 activates the microprocessor PROC. The latter retrieves the instructions of the first program part P1 from the memory MV in order to execute them in step S30.

The instructions of the first program part P1 allow the microprocessor PROC to perform a second computation of a second new identifier of the second program part P2 in step S31.

The second computation comprises implementing a second hash function having the data of the second program part P2 and said hardware key TK1 as input parameters and delivering the second new identifier at output.

To perform said second computation, the microprocessor PROC retrieves the data of the second program part P2 from the memory MV and the hardware key TK1 from the second protected module MD2.

If no item of data has been modified in the second program part, the new second identifier does not change from the second identifier.

The second identifier and the second new identifier being identical therefore makes it possible to confirm that said second program part P2 has not been modified.

A second comparison is therefore performed in step S32 between the second new identifier and the second identifier.

Once step S32 has ended, the microprocessor PROC sends the second signal SIG2 to the fourth module MD4.

If the second signal SIG2 is in a low state, as in step S33, this means that the second new identifier and the second identifier are not identical, otherwise the second signal SIG2 is in a high state, as illustrated in step S34.

The high state of the second signal SIG2 makes it possible to confirm that the second program part P2 is authentic. The program PR is therefore authentic as well.

Step S4 is then accessed.

In step S4, the microprocessor PROC locks access to the hardware key TK1.

In this respect, as indicated above, when the system is booted, only the module MD1 is activated.

Following the authentication of the first program part P1, the module MD1 activates the microprocessor PROC, and the other modules of the system remain inactive.

Once the authentication of the second program part has ended, access to the key TK1 may be locked in any known manner, for example by writing a value to a register of the module MD2, the result of which will be to return a predetermined word, for example a word formed only of zeros, rather than the key itself, in response to a subsequent request to read the key.

Access to the key is therefore locked until the next reboot of the system.

Also, throughout the entire time during which the key TK1 is accessible, only the microprocessor PROC is able to access it. Access to the key is therefore reserved for the microprocessor PROC.

Once said access has been locked, the microprocessor PROC recovers the instructions of the second program part P2 from the memory MV in order to execute them in step S5.

The invention claimed is:

1. A method for authenticating a program stored in a memory, said program configured to be executed by a microprocessor and including a first program part and a second program part, the method including:
 storing a key in a protected module;
 storing in the second program part a second identifier of the second program part;
 performing a first authentication of said first program part by a module situated outside said microprocessor with the microprocessor being in an inactive mode;
 if the first program part is authenticated by said module, activating said microprocessor to execute said first program part, including permitting access to the key in response to execution of said first program part by the activated microprocessor and performing a second authentication of said second program part;
 wherein performing the second authentication comprises:
  computing a second new identifier of the second program part by implementing a second hash function having said second program part and said key as input parameters and delivering said second new identifier as output;
  comparing the second identifier to the second new identifier; and
  authenticating the second program part if the second identifier and the second new identifier are identical; and
 if the second part is authenticated, blocking access to said key in the protected module and executing said second program part by the activated microprocessor.

2. The method according to claim 1, comprising, prior to performing the first authentication, storing in said module a first identifier of the first program part, and wherein performing the first authentication includes:
 computing a first new identifier of the first program part;
 comparing the first identifier to the first new identifier; and
 authenticating the second program part if the second identifier and the second new identifier are identical.

3. The method according to claim 2, wherein computing the first new identifier comprises implementing a first hash function having said first program part as input parameter and delivering said first new identifier as output.

4. The method according to claim 1, wherein performing the first authentication occurs in response to a system boot, and wherein blocking access to said key comprises blocking access to the protected module wherein the key is stored until a next system boot occurs.

5. The method according to claim 1, further comprising restricting access to the key to only the activated microprocessor.

6. A system, comprising:
 a microprocessor;
 a memory configured to store a program to be executed by the microprocessor and comprising a first program part and a second program part, wherein the second program part comprises a second identifier; and
 an authentication circuit configured to authenticate the program, said authentication circuit comprising:
  a module external to the microprocessor and configured to authenticate said first program part while the microprocessor is in an inactive mode and, if the first program part is authenticated, then configure the microprocessor in an active mode; and
  a protected module configured to store a key in a manner where the stored key is accessible only in response to execution of said first program part by the microprocessor;
 wherein the microprocessor, in the active mode, is configured to execute said first program part and authenticate said second program part using instructions of the first program part to perform a second computation of a second new identifier and a comparison of the second identifier with the second new identifier, the first program part being considered to be authenticated if the first identifier and the first new identifier are identical;
 wherein the second computation comprises implementation of a second hash function having said second program part and the key from the protected module as input parameters and delivering the second new identifier as output;
 wherein the microprocessor is further configured, if the second program part is authenticated, to block access to said key in the protected module and execute the second program part.

7. The system according to claim 6, wherein said module stores a first identifier of the first program part determined prior to the authentication of the first program part, said module further configured to perform a first computation of a first new identifier of the first program part and comparison of the first identifier to the first new identifier, the first program part being considered to be authenticated by said module if the first identifier and the first new identifier are identical.

8. The system according to claim 7, wherein the first computation comprises implementation of a first hash function having said first program part as an input parameter and delivering the first new identifier as output.

9. The system according to claim 6, wherein said module performs the first authentication in response to a system boot, and wherein the microprocessor blocks access to the protected module wherein the key is stored until a next system boot occurs.

10. The system according to claim 6, wherein the protected module is configured to restrict access to the key to only the activated microprocessor.

* * * * *